United States Patent
Lee

(10) Patent No.: US 11,326,043 B2
(45) Date of Patent: May 10, 2022

(54) COMPOSITIONS FOR HIGH REINFORCED SIDEWALLS

(71) Applicant: Dow Chemical Korea Limited, Seoul (KR)

(72) Inventor: Heung Goo Lee, Seoul (KR)

(73) Assignee: Dow Chemical Korea Limited, Seoul (KR)

( * ) Notice: Subject to any disclaimer, the term of this patent is extended or adjusted under 35 U.S.C. 154(b) by 253 days.

(21) Appl. No.: 16/641,109

(22) PCT Filed: Aug. 28, 2018

(86) PCT No.: PCT/KR2018/009924
§ 371 (c)(1),
(2) Date: Feb. 21, 2020

(87) PCT Pub. No.: WO2019/045417
PCT Pub. Date: Mar. 7, 2019

(65) Prior Publication Data
US 2020/0255632 A1    Aug. 13, 2020

(30) Foreign Application Priority Data
Aug. 29, 2017 (KR) .................. 10-2017-0109236

(51) Int. Cl.
*C08L 7/00* (2006.01)
*C08L 9/00* (2006.01)
*C08L 23/08* (2006.01)
*B60C 1/00* (2006.01)

(52) U.S. Cl.
CPC .............. *C08L 7/00* (2013.01); *B60C 1/0025* (2013.01); *C08L 9/00* (2013.01); *C08L 23/0815* (2013.01); *C08L 2205/025* (2013.01); *C08L 2205/035* (2013.01); *C08L 2312/00* (2013.01)

(58) Field of Classification Search
CPC ... C08L 7/00; C08L 9/00; C08L 23/08; B60C 1/00
USPC ....................................................... 523/156
See application file for complete search history.

(56) References Cited

U.S. PATENT DOCUMENTS

| | | |
|---|---|---|
| 5,272,236 A | 12/1993 | Lai et al. |
| 5,278,272 A | 1/1994 | Lai et al. |
| 6,812,289 B2 | 11/2004 | Van Dun et al. |
| 7,608,668 B2 | 10/2009 | Li Pi Shan et al. |
| 7,893,166 B2 | 2/2011 | Shan et al. |
| 7,947,793 B2 | 5/2011 | Marchand et al. |
| 2005/0222335 A1 | 10/2005 | Jones et al. |
| 2006/0041071 A1 | 2/2006 | Sandstrom |
| 2009/0115108 A1 | 5/2009 | Rodgers et al. |
| 2010/0028568 A1* | 2/2010 | Weaver ................ C09D 123/02 428/17 |
| 2015/0166755 A1 | 6/2015 | Kim |
| 2017/0233549 A1 | 8/2017 | Randall et al. |
| 2018/0155535 A1 | 6/2018 | Welles et al. |

FOREIGN PATENT DOCUMENTS

| | | |
|---|---|---|
| JP | 2000-038473 A1 | 2/2000 |
| WO | 93/08221 A2 | 4/1993 |

* cited by examiner

*Primary Examiner* — Deve V Hall
(74) *Attorney, Agent, or Firm* — Quarles & Brady LLP

(57) ABSTRACT

This invention provides a composition comprising a natural rubber, a polybutadiene rubber and an ethylene/α-olefin copolymer and/or ethylene/α-olefin multiblock copolymer. The invention also provides for methods of making the composition, and articles prepared from the composition.

10 Claims, No Drawings

COMPOSITIONS FOR HIGH REINFORCED SIDEWALLS

TECHNICAL FIELD

This invention relates to rubber compositions containing a natural rubber, a polybutadiene rubber and a polyolefin, to methods of making the same, and to articles prepared from the same.

BACKGROUND ART

Pneumatic runflat tires are tires that are capable of being used while uninflated (with total loss of air pressure other than ambient atmospheric pressures). A vehicle equipped with such tires can continue to be driven after the tire experiences loss of pneumatic pressure, such as loss of air pressure caused by puncture or valve failure. Tires of this type are also referred to as extended mobility tires (EMT).

A key component of many runflat tires is a stiff sidewall (rubber) insert, which supports most of the weight of the vehicle on the tire during conditions following loss of air pressure, and allows driving even through the tire pressure may be zero. Conventional sidewall inserts for runflat tires utilize natural rubber (NR) and polybutadiene rubber (BR) as the base polymer with carbon black as a filler. Typically, the filler type or loading is used to increase the material stiffness of the sidewall insert. In the vehicle industry, the trend has been to decrease the weight of components and thus the overall weight of the vehicle.

DISCLOSURE OF INVENTION

Technical Problem

There is a need for polymeric formulations that can be used to form products such as sidewall inserts, with a higher level of hardness and modulus, and an increased material stiffness, while maintaining or decreasing the density of the material, compared to that of products such as sidewall inserts formed from conventional rubber formulations. Some of these needs and other have been met by the following invention.

Solution to Problem

The invention provides a composition comprising, at least the following:

A) a natural rubber having a density from 0.90 to 0.93 g/cm$^3$ and a Mooney viscosity (ML(1+4)@100° C.) from 50 to 90;

B) a butadiene rubber having a density from 0.90 to 0.93 g/cm$^3$ and a Mooney viscosity (ML(1+4)@100° C.) from 40 to 110; and C) at least one ethylene-based polymer selected from the following:

i) an ethylene/α-olefin copolymer having a density from 0.870 to 0.902, and a

Mooney viscosity (ML(1+4)@121° C.) from 2 to 23;

ii) an ethylene/α-olefin multiblock copolymer having a density from 0.866 to 0.887, a Mooney viscosity (ML (1+4)@121° C.) from 4 to 20; or iii) a combination of i) and ii).

Mooney viscosity is that of the base polymer (calculated viscosity of neat polymer for polymers that contain filler, such as carbon black).

In an embodiment, the at least one ethylene-based polymer is an ethylene/α-olefin copolymer having a melt index ($I_2$) from 1 to 30. In an embodiment, the at least one ethylene-based polymer is an ethylene/α-olefin multiblock copolymer having a melt index ($I_2$) from 1 to 15.

The invention also provides a method of making a polymeric composition, the method comprising mixing together at least a natural rubber, a butadiene rubber, and an ethylene/α-olefin copolymer and/or an ethylene/α-olefin multiblock copolymer, and optionally, at least one oil and/or filler.

The invention also provides an article comprising at least one component formed from the composition. In an embodiment, the article is an automotive part. In an embodiment, the article is a tire or a sidewall insert for a tire.

MODE FOR THE INVENTION

It has been found that the incorporation of an ethylene-based, polyolefin elastomer (POE) and/or olefin block copolymer (OBC) into a natural rubber/butadiene rubber formulation provides a composition having unexpectedly increased mechanical properties, while maintaining the density of the base rubbers, which can be used to produce a slim contour for a sidewall insert for a significant weight reduction of a runflat tire without sacrificing the endurance of the tire.

In particular, the invention provides a composition comprising at least the following:

A) a natural rubber having a density from 0.90 to 0.93 g/cm$^3$ and a Mooney viscosity (ML(1+4)@100° C.) from 50 to 90;

B) a butadiene rubber having a density from 0.90 to 0.93 g/cm$^3$ and a Mooney viscosity (ML(1+4)@100° C.) from 40 to 110; and C) at least one ethylene-based polymer selected from the following:

i) an ethylene/α-olefin copolymer having a density from 0.870 to 0.902, and a

Mooney viscosity (ML(1+4)@ 121° C.) from 2 to 23;

ii) an ethylene/α-olefin multiblock copolymer having a density from 0.866 to 0.887, and a Mooney viscosity (ML (1+4)@ 121° C.) from 4 to 20; or iii) a combination of i) and ii).

Mooney viscosity is that of the base polymer (calculated viscosity of neat polymer for polymers that contain filler, such as carbon black).

In an embodiment, the density ratio of Component C to Component A is from 0.94 to 1.00

In an embodiment, the ratio of the Mooney viscosity of Component A to the melt index of Component C is from 12 to 60.

In an embodiment, Component C is i) an ethylene/α-olefin copolymer, and the weight ratio of Component C to Component A is from 0.22 to 0.64.

In an embodiment, Component C is ii) an ethylene/α-olefin multiblock copolymer, and the weight ratio of Component C to Component A is from 0.20 to 0.50.

In one embodiment, component C) is the following: i) an ethylene/α-olefin copolymer having a density from 0.870 to 0.902, and a Mooney viscosity (ML(1+4)@121° C.) from 2 to 23.

In one embodiment, component C) is the following: ii) an ethylene/α-olefin multiblock copolymer having a density from 0.866 to 0.887, a Mooney viscosity (ML(1+4)@121° C.) from 4 to 20.

In one embodiment, component C) comprises both the following: i) an ethylene/α-olefin copolymer having a density from 0.870 to 0.902, and a Mooney viscosity (ML(1+4)@121° C.) from 2 to 23; and ii) an ethylene/α-olefin multiblock copolymer having a density from 0.866 to 0.887, a Mooney viscosity (ML(1+4)@121° C.) from 4 to 20.

In an embodiment, the natural rubber is polyisoprene. In an embodiment, the polyisoprene is a natural polyisoprene or a synthetic polyisoprene, and preferably a natural polyisoprene. In another embodiment, the polyisoprene is a natural cis-1,4-polyisoprene. In another embodiment, the polyisoprene is a synthetic cis-1,4-polyisoprene. In an embodiment the natural rubber has a density from 0.90 to 0.93 g/cm$^3$. In an embodiment, the polyisoprene has a Mooney viscosity, ML(1+4)@100° C., from 50 to 90, or from 50 to 80, or from 55 to 75, or from 60 to 70. In another embodiment, the polyisoprene is derived from a non-granular, bale form.

In an embodiment, the butadiene rubber has a density from 0.90 to 0.93 g/cm$^3$. In an embodiment, the butadiene rubber has a Mooney viscosity (ML(1+4)@100° C.) from 40 to 110, or from 40 to 80, or from 40 to 60. In an embodiment, the butadiene rubber is polybutadiene. In another embodiment, the polybutadiene contains a high cis content of greater than 97 percent, based on the total weight of polymerizable monomer.

In an embodiment, the at least one ethylene-based polymer is an ethylene/α-olefin copolymer. In an embodiment, the ethylene/α-olefin copolymer has a Mooney viscosity (ML(1+4)@121° C.) from 2 to 23, or from 4 to 23, or from 8 to 23. Mooney viscosity is that of the base polymer (calculated viscosity of neat polymer for polymers that contain filler, such as carbon black). In an embodiment, the at least one ethylene-based polymer is an ethylene/α-olefin copolymer having a melt index ($I_2$) from 1 to 30 g/10 min. In a further embodiment, the ethylene/α-olefin copolymer is ethylene/octene copolymer.

In another embodiment, the at least one ethylene-based polymer is an ethylene/α-olefin multiblock copolymer. In an embodiment, the ethylene/α-olefin multiblock copolymer has a Mooney viscosity (ML(1+4)@121° C.) from 4 to 20, or from 8 to 20, or from 12 to 20. Mooney viscosity is that of the base polymer (calculated viscosity of neat polymer for polymers that contain filler, such as carbon black). In an embodiment, the at least one ethylene-based polymer is an ethylene/α-olefin multiblock copolymer having a melt index ($I_2$) from 1 to 15 g/10 min. In a further embodiment, the ethylene/α-olefin multiblock copolymer is an ethylene/octene multiblock copolymer.

In another embodiment, the at least one ethylene-based polymer is a blend of an ethylene/α-olefin copolymer and an ethylene/α-olefin multiblock copolymer. In an embodiment, the blend of the ethylene/α-olefin copolymer and ethylene/α-olefin multiblock copolymer has a Mooney viscosity (ML(1+4)@121° C.) from 3 to 22, or from 5 to 22, or from 8 to 22. Mooney viscosity is that of the polymer blend (calculated viscosity of neat polymer blend for polymer blends that contain filler, such as carbon black). In an embodiment, the at least one ethylene-based polymer is a blend of an ethylene/α-olefin copolymer and an ethylene/α-olefin multiblock copolymer, the mixture having a melt index ($I_2$) from 1 to 29 g/10 min. In a further embodiment, the ethylene-based polymer is a blend of an ethylene/octene copolymer and an ethylene/octene multiblock copolymer.

In an embodiment, the natural rubber is present in an amount from greater than, or equal to, 30 wt %, or 35 wt %, or 40 wt % based on the total weight of the composition. In another embodiment, the natural rubber is present in an amount less than 55 wt %, or 50 wt %, or 45 wt %, based on the total weight of the composition. In an embodiment, the natural rubber is present in an amount from 30 to 55 wt %, or from 35 to 50 wt %, or from 40 to 45 wt %, based on the total weight of the composition.

In an embodiment, the butadiene rubber is present in an amount from greater than or equal to 30 wt %, or 35 wt %, or 40 wt %, based on the total weight of the composition. In another embodiment, the butadiene rubber is present in an amount up to 55 wt %, or 50 wt %, or 45 wt %, based on the total weight of the composition. In an embodiment, the butadiene rubber is present in an amount from 30 to 55 wt %, or from 35 to 50 wt %, or from 40 to 45 wt %, based on the total weight of the composition.

In an embodiment, the at least one ethylene-based polymer is present in a sum total amount from greater than or equal to 5 wt %, or greater than or equal to 10 wt %, based on the total weight of the composition. In another embodiment, the at least one ethylene-based polymer is present in a sum total amount up to 30, or up to 25, or up to 20, wt %, based on the total weight of the composition. In another embodiment, at least one ethylene-based polymer is present in a sum total amount from 5 to 30 wt %, based on the total weight of the composition.

In an embodiment, the at least one ethylene-based polymer is a blend of an ethylene/α-olefin copolymer and an ethylene/α-olefin multiblock copolymer at a ratio of 5:95 to 95:5 (w/w). In an embodiment, the composition comprises A) from 30 to 55 wt % natural rubber; B) from 30 to 55 wt % butadiene rubber; and C) from 5 to 30 wt % of the at least one ethylene-based polymer selected from an ethylene/α-olefin copolymer and/or an ethylene/α-olefin multiblock copolymer, based on the total weight of the composition.

In an embodiment, the composition comprises a sum total of Components A, B and C of at least 80, or at least 85, or at least 90, or at least 95, wt %, based on the total weight of the composition.

In an embodiment, the composition has a Mooney viscosity (ML(1+4)@125° C.) from 35 to 90, or from 40 to 85, or from 42 to 80, or 45 to 70.

In an embodiment, the composition has a density from 1.04 to 1.15, or from 1.05 to 1.13, or from 1.06 to 1.10, g/cm$^3$.

In an embodiment, the composition has a Shore A hardness from 65 to 90, or from 70 to 80.

In an embodiment, the composition has a heat build-up delta temperature of 50° C. or less, or 40° C. or less, or 30° C. or less, or from 20 to 50° C.

In an embodiment, the composition comprises less than 1 wt %, or less than 0.5 wt %, or less than 0.1 wt %, or zero (0) wt %, of an ethylene/α-olefin/diene (EAODM) interpolymer (e.g., ethylene/propylene/diene (EPDM)).

In an embodiment, the composition further comprises at least one filler. In an embodiment, the filler is carbon black. In another embodiment, the composition contains from 15 to 40 wt %, or from 20 to 35 wt %, or from 35 to 30 wt %, of carbon black, based on the total weight of the composition.

In an embodiment, the composition further comprises one or more additives. In an embodiment, the additive is selected from plasticizers, processing oils, vulcanization accelerators, crosslinking agents, antioxidants, antiozonants, peptizers, activators, fatty acids, accelerators, tackifiers, homogenizing agents, pigments, colorants, flame retardants, UV light stabilizers, fungicides, slip agents, and the like, and combinations thereof.

In a further embodiment, the composition further comprises at least one processing oil. In an embodiment, the processing oil is selected from the group consisting of aromatic oils, paraffinic oil, and naphthenic oils.

An inventive composition may comprise a combination of two or more embodiments as described herein.

The invention also provides a crosslinked composition formed from the composition. In an embodiment, the crosslinked composition has a density from 1.04 to 1.15, or from 1.05 to 1.13, g/cm².

The invention also provides an article comprising at least one component formed from the composition. In an embodiment, the article is an automotive part. In another embodiment, the article is a tire or an insert for a tire.

An inventive article may comprise a combination of two or more embodiments as described herein.

The invention also provides a method of making a polymeric composition. In an embodiment, the method comprises mixing together at least a natural rubber, a butadiene rubber, and at least one ethylene-based polymer selected from an ethylene/α-olefin copolymer and/or an ethylene/α-olefin multiblock copolymer, and optionally, at least one processing oil and/or filler.

In an embodiment, the method comprises mixing together at least A) a natural rubber having a density from 0.90 to 0.93 g/cm³ and a Mooney viscosity (ML(1+4)@100° C.) from 50 to 90; B) a butadiene rubber having a density from 0.90 to 0.93 g/cm³ and a Mooney viscosity (ML(1+4)@100° C.) from 40 to 110, and C) at least one ethylene-based polymer selected from the following: i) an ethylene/α-olefin copolymer having a density from 0.870 to 0.902, and a Mooney viscosity (ML(1+4)@121° C.) from 2 to 23, ii) an ethylene/α-olefin multiblock copolymer having a density from 0.866 to 0.887, and a Mooney viscosity (ML(1+4)@121° C.) from 4 to 20, or iii) a combination of i) and ii), and D) optionally, at least one processing oil and/or filler. Mooney viscosity is that of the neat polymer (calculated viscosity of neat polymer for polymers that contain a filler, such as carbon black). In an embodiment, the ethylene-based polymer is an ethylene/α-olefin copolymer having a melt index ($I_2$) from 1 to 30 g/10 min. In an embodiment, the ethylene-based polymer is an ethylene/α-olefin multiblock polymer having a melt index ($I_2$) from 1 to 15 g/10 min. In an embodiment, the ethylene-based polymer is a mixture of an ethylene/α-olefin copolymer and an ethylene/α-olefin multiblock polymer, wherein the ethylene-based polymer mixture has a melt index ($I_2$) from 1 to 29 g/10 min.

An inventive method may comprise a combination of two or more embodiments as described herein.

Natural Rubber

In an embodiment, the composition comprises a natural rubber. In an embodiment, the natural rubber is a polyisoprene. In an embodiment, the polyisoprene is a natural polyisoprene. In an embodiment, the polyisoprene is a synthetic polyisoprene. In a preferred embodiment, the polyisoprene is a natural polyisoprene. Suitable polyisoprenes include, but are not limited to, natural cis-1,4-polyisoprene, synthetic cis-1,4-polyisoprene, high vinyl 3,4-polyisoprene, and 3,4-polyisoprene.

In an embodiment, the polyisoprene has a density of at least 0.90, or at least of 0.91, or at least 0.92 g/cm³, up to 0.93 g/cm³.

In an embodiment, the polyisoprene has a Mooney Viscosity (ML(1+4)@100° C.) from 50 to 90, preferably from 50 to 80, and more preferably from 60 to 70. Mooney viscosity is that of the base polymer (calculated viscosity of neat polymer for polymers that contain filler, such as carbon black).

In another embodiment, the polyisoprene is derived from a non-granular, bale form.

Suitable examples of polyisoprenes include the following technical grades: STR-20 (TongThai Technical Rubber Co., Ltd., Thailand), SMR (Standard Malaysian Rubber), such as SRM 5 and SMR 20; TSR (Technical Specified Rubber) and RSS (Ribbed Smoked Sheets).

Butadiene Rubber

In an embodiment, the butadiene rubber is polybutadiene. Suitable polybutadienes include, but are not limited to, natural cis-1,4-polybutadiene, trans-1,4-polybutadiene, vinyl-1,2-polybutadiene, copolymers of styrene and butadiene, copolymers of isoprene and butadiene, and interpolymers of styrene, isoprene and butadiene.

In an embodiment, the polybutadiene contains a high cis content of greater than 97%, based on the total weight of polymerizable monomer.

In an embodiment, the polybutadiene has a density of at least 0.90, or at least of 0.91, or at least 0.92 g/cm³, up to 0.93 g/cm³.

In an embodiment, the polybutadiene has a Mooney Viscosity (ML(1+4)@100° C.) from 40 to 110, preferably from 40 to 80, and more preferably from 40 to 60. Mooney viscosity is that of the base polymer (calculated viscosity of neat polymer for polymers that contain filler, such as carbon black).

Examples of suitable polybutadienes include KBR 01 from Kumho Petrochemical (Korea), EUROPRENE NEOCIS BR 40 from Polimeri Europe, and BUNA CB 24 Lanxess.

Ethylene/α-Olefin Copolymer

As used herein, "ethylene/alpha-olefin copolymer" refers to a polymer comprising repeating units derived from ethylene and one α-olefin comonomer.

The ethylene/α-olefin copolymer comprises greater than 50 mol %, for example, greater than or equal to 60 mol %, greater than or equal to 70 mol %, greater than or equal to 80 mol %, or greater than or equal to 90 mol % of the units derived from ethylene. The ethylene/α-olefin copolymer also comprises less than 30 mol %, for example, less than or equal to 25 mol %, or less than or equal to 20 mol %, less than or equal to 15 mol %, or less than or equal to 10 mol % of the units derived from one or more α-olefin comonomers. In an embodiment, the ethylene/α-olefin copolymer comprises greater than 50 mol % of the units derived from ethylene and less than 30 mol % of the units derived from one or more α-olefin comonomers.

The α-olefin can be either an aliphatic or an aromatic compound, and can contain vinylic unsaturation or a cyclic compound, such as styrene, p-methyl styrene, cyclobutene, cyclopentene, norbornene. The α-olefin comonomer is preferably a $C_3$ to $C_{20}$ aliphatic compound, preferably a $C_3$ to $C_{10}$ aliphatic compound. Exemplary unsaturated α-olefin comonomers include, but are not limited to, 4-vinylcyclohexane, vinylcyclohexane and $C_3$ to $C_{10}$ aliphatic α-olefins including propylene, isobutylene, 1-butene, 1-pentene, 1-hexene, 3-methyl-1-pentene, 4-methyl-1-pentene, 1-heptene, 1-octene, 1-decene and 1-dodecene. In another embodiment, the α-olefin comonomer is selected from the group consisting of propylene, 1-butene, 1-hexane and 1-octene.

The ethylene/α-olefin copolymer may be heterogeneously branched or homogeneously branched. Heterogeneously branched copolymers may be produced by Ziegler-Natta type catalysts, and contain a non-homogeneous distribution of comonomer among the molecules of the copolymer. Homogeneously branched copolymers may be produced, for example, by single-site catalyst systems, and contain a substantially homogeneous distribution of comonomer among the molecules of the copolymer.

In embodiments herein, the ethylene/α-olefin copolymer has a density ranging from 0.870 to 0.902, or from 0.87 to 0.89, or from 0.87 to 0.88, g/cm$^3$. All individual values and subranges from 0.870 to 0.902 g/cm$^3$ are included and disclosed herein. Densities disclosed herein for ethylene/α-olefin copolymer are determined according to ASTM D-792.

In further embodiments, the ethylene/α-olefin copolymer has a Mooney viscosity (ML(1+4)@121° C.) of at least 2, or at least 4, or at least 8, up to 23. Mooney viscosity of the ethylene/α-olefin copolymer is that of the base polymer (calculated viscosity of neat polymer for polymers that contain filler, such as carbon black).

In further embodiments, the ethylene/α-olefin copolymer has a melt index ($I_2$) from 1 to 30, or from 1 to 15, or from 1 to 10, g/10 min (190° C./2.16 kg). All individual values and subranges from 1 to 30 g/10 min are included and disclosed herein. Melt index, or $I_2$, for the ethylene/α-olefin copolymer is determined according to ASTM D1238 at 190° C., 2.16 kg.

Commercial examples of ethylene/α-olefin copolymers (elastomers) suitable for use herein include homogeneously branched, substantially linear ethylene/α-olefin polymers, e.g., ENGAGE™ polyolefin elastomers (e.g., ENGAGE™ 8003, 8400, 8450 and 8480 polyolefin elastomers) and AFFINITY™ polyolefin plastomers, available from The Dow Chemical Company, Midland, Mich. USA, EXCEED™ and EXACT™ polymers available from ExxonMobil Chemical Company, Houston, Tex. USA, and TAFMER™ polymers available from the Mitsui Chemical Company.

Any conventional ethylene (co)polymerization reaction processes may be employed to produce the ethylene/α-olefin copolymer. Exemplary conventional ethylene (co)polymerization reaction processes include, but are not limited to, slurry phase polymerization process, solution phase polymerization process, and combinations thereof using one or more conventional reactors, e.g., loop reactors, stirred tank reactors, batch reactors in parallel, series, and/or any combinations thereof. Suitable methods for forming an ethylene/α-olefin copolymer can be found in U.S. Pat. No. 4,547,475, which is herein incorporated by reference for that purpose.

In some embodiments, the ethylene/α-olefin copolymer may be produced using a solution-phase polymerization process. Such a process may occur in a well-stirred reactor such as a loop reactor or a sphere reactor at temperature from about 150° C. to about 300° C., or from about 180° C. to about 200° C., and at pressures from about 30 to about 1000 psi, or from about 600 to about 850 psi. The residence time in such a process is from about 2 to about 20 minutes, or from about 3 to about 10 minutes. Ethylene, solvent, catalyst, and optionally one or more comonomers are fed continuously to the reactor. Exemplary catalysts in these embodiments include, but are not limited to, Ziegler-Natta catalysts. Exemplary solvents include, but are not limited to, isoparaffins. For example, such solvents are commercially available under the name ISOPAR E (ExxonMobil Chemical Co., Houston, Tex. USA). The resultant mixture of ethylene/α-olefin copolymer and solvent is then removed from the reactor and the polymer is isolated. Solvent is typically recovered via a solvent recovery unit, that is, heat exchangers and vapor liquid separator drum, and is recycled back into the polymerization system.

An exemplary multi-constituent catalyst system can include a Ziegler-Natta catalyst composition including a magnesium- and titanium-containing procatalyst and a co-catalyst (reducing agents) including aluminum compounds, compounds of lithium, sodium and potassium, alkaline earth metals, and compounds of other earth metals.

Other catalysts systems that may be used to form the ethylene/α-olefin copolymer include metallocene catalysts, constrained geometry catalysts ("CGC Catalyst"), such as those disclosed in U.S. Pat. Nos. 5,272,236, 5,278,272, 6,812,289, and WO93/08221, and also metallocene "bis-CP catalysts".

The ethylene/α-olefin copolymer can comprise a combination of two or more embodiments described herein.

Ethylene/α-Olefin Block Copolymer

As used herein, the terms "ethylene/α-olefin block copolymer," "olefin block copolymer," or "OBC," mean an ethylene/α-olefin multi-block copolymer, and includes ethylene and one or more copolymerizable α-olefin comonomer in polymerized form, characterized by multiple blocks or segments of two or more polymerized monomer units, differing in chemical or physical properties. The terms "interpolymer" and "copolymer" are used interchangeably, herein, for the term ethylene/α-olefin block copolymer, and similar terms discussed in this paragraph. When referring to amounts of "ethylene" or "comonomer" in the copolymer, it is understood that this means polymerized units thereof. In some embodiments, the multi-block copolymer can be represented by the following formula:

$$(AB)_n,$$

where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, A blocks and B blocks are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows:

AAA-AA-BBB-BB.

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

In an embodiment, ethylene comprises the majority mole fraction of the whole block copolymer, i.e., ethylene comprises at least 50 mole percent (mol %) of the whole polymer. More preferably ethylene comprises at least 60, at least 70, or at least 80, mol %, with the substantial remainder of the whole polymer comprising at least one other comonomer that is preferably an α-olefin having 3 or more carbon atoms. In some embodiments, the olefin block copolymer may comprise 50 to 90 mol % ethylene, preferably 60 to 85 mol %, more preferably 65 to 80 mol %. For many ethylene/octene block copolymers, the preferred composition comprises an ethylene content greater than 80 mol % of the whole polymer and an octene content from 10 to 15 mol %, preferably from 15 to 20 mol % of the whole polymer.

The ethylene/α-olefin block copolymer includes various amounts of "hard" and "soft" segments. "Hard" segments are blocks of polymerized units, in which ethylene is present in an amount greater than 95, or greater than 98, wt %, based on the weight of the polymer, up to 100 wt %. In other words, the comonomer content (content of monomers other than ethylene) in the hard segments is less than 5, or less than 2, wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5, or greater than 8, greater than 10, or greater than 15, wt %, based on the weight of the polymer. In some embodiments, the comonomer content in the soft segments can be greater than 20, greater than 25, greater than 30, greater than 35, greater than 40, greater than 45, greater than 50 w, or greater than 60, wt %, and can be up to 100 wt %.

The soft segments can be present in an OBC from 1 to 99 wt % of the total weight of the OBC, or from 5 to 95, from 10 to 90, from 15 to 85, from 20 to 80, from 25 to 75, from 30 to 70, from 35 to 65, from 40 to 60, or from 45 to 55, wt %, of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No, 7,608,668. In particular, hard and soft segment weight percentages and comonomer content may be determined as described in cols. 57-63 of U.S. Pat. No. 7,608,668, herein incorporated by reference for that purpose.

The ethylene/α-olefin block copolymer is a polymer comprising two or more chemically distinct regions or segments (referred to as "blocks") preferably joined in a linear manner, that is, a polymer comprising chemically differentiated units, which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyperbranching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a polydispersity index, PDI (or MWD), from 1.7 to 3.5, or from 1.8 to 3, or from 1.8 to 2.5, or from 1.8 to 2.2. When produced in a batch or semi-batch process, the OBC possesses PDI from 1.0 to 3.5, or from 1.3 to 3, or from 1.4 to 2.5, or from 1.4 to 2.

In addition, the ethylene/α-olefin block copolymer possesses a PDI fitting a Schultz-Flory distribution rather than a Poisson distribution. The OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the ethylene/α-olefin block copolymer possesses a most probable distribution of block lengths. In an embodiment, the ethylene/α-olefin block copolymer is defined as having at least one of the following properties A through E:

(A) Mw/Mn from 1.7 to 3.5, at least one melting point, Tm, in degrees Celsius, and a density, d, in grams/cubic centimeter, where in the numerical values of Tm and d correspond to the relationship:

Tm>−2002.9+4538.5(d) −2422.2(d)$^2$, and/or (B) Mw/Mn from 1.7 to 3.5, and is characterized by a heat of fusion, ΔH in J/g, and a delta quantity, ΔT, in degrees Celsius, defined as the temperature difference between the tallest DSC peak and the tallest Crystallization Analysis Fractionation ("CRYSTAF") peak, wherein the numerical values of ΔT and ΔH have the following relationships:

ΔT>−0.1299 ΔH+62.81 for ΔH greater than zero and up to 130 J/g

ΔT>48 for ΔH greater than 130 J/g wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

Re>1481−1629(d); and/or (D) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; and/or, (E) has a storage modulus at 25° C., G'(25° C.), and a storage modulus at 100° C., G'(100° C.), wherein the ratio of G'(25° C.) to G'(100° C.) is in the range of 1:1 to 9:1.

In an embodiment, the ethylene/α-olefin block copolymer can also have:

(F) a molecular fraction which elutes between 40° C. and 130° C. when fractionated using TREF, characterized in that the fraction has a block index of at least 0.5 and up to 1, and a molecular weight distribution, Mw/Mn, greater than 1.3; and/or (G) an average block index greater than zero and up to 1.0 and a molecular weight distribution, Mw/Mn greater than 1.3.

It is understood that the ethylene/α-olefin block copolymer can have one, some, all, or any combination of properties (A) through (G). Block Index can be determined as described in detail in U.S. Pat. No. 7,608,668, herein incorporated by reference for that purpose. Analytical methods for determining properties (A) through (G) are disclosed in, for example, U.S. Pat. No. 7,608,668 at col. 31, line 26 through col. 35, line 44, which is herein incorporated by reference for that purpose.

Suitable monomers for use in preparing the OBC include ethylene and one or more addition polymerizable monomers other than ethylene. Examples of suitable comonomers include $C_{3-30}$, preferably $C_{3-20}$, straight-chain or branched α-olefins such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; $C_{3-30}$, preferably $C_{3-20}$, cycloolefins such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di-and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the ethylene/α-olefin block copolymer has a density ranging from 0.866 to 0.89 g/cm$^3$, or from 0.87 to 0.89 g/cm$^3$, or from 0.87 to 0.88 g/cm$^3$. All individual values and subranges from 0.866 to 0.887 g/cm$^3$ are included and disclosed herein. Densities disclosed herein for ethylene/α-olefin block copolymer are determined according to ASTM D-792.

In an embodiment, the ethylene/α-olefin block copolymer has a Mooney viscosity (ML(1+4)@121° C.) from 4 to 20, or from 8 to 20, or from 12 to 20. Mooney viscosity of the ethylene/α-olefin copolymer is that of the base polymer (calculated viscosity of neat polymer for polymers that contain filler, such as carbon black).

In an embodiment, the ethylene/α-olefin block copolymer has a melt index (MI or $I_2$) from 1 to 15, or from 1 to 10, or from 1 to 5, g/10 min. All individual values and subranges from 1 to 15 g/10 min are included and disclosed herein. Melt index, or $I_2$, for the ethylene/α-olefin block copolymer is determined according to ASTM D1238 at 190° C., 2.16 kg.

In an embodiment, the ethylene/α-olefin block copolymer excludes styrene.

In an embodiment, the ethylene/α-olefin block copolymer comprises polymerized ethylene and one α-olefin as the only monomer types. In a further embodiment, the α-olefin is selected from propylene, 1-butene, 1-hexene or 1-octene.

In an embodiment, the ethylene/α-olefin block copolymer is an ethylene/octene block copolymer.

The ethylene/α-olefin block copolymers can be produced via a chain shuttling process, such as described in U.S. Pat. No. 7,858,706, which is herein incorporated by reference. In particular, suitable chain shuttling agents and related information are listed in U.S. Pat. No. 7,858,706 at col. 16, line 39, through col. 19, line 44; suitable catalysts are described at col. 19, line 45, through col. 46, line 19 and suitable co-catalysts at col. 46, line 20, through col. 51 line 28; and the process is described particularly at col. 51, line 29 through col. 54, line 56. The process is also described, for example, in U.S. Pat. No. 7,608,668; 7,893,166; and 7,947,793.

The ethylene/α-olefin block copolymer may comprise a combination or two or more embodiments described herein.

Fillers

The polymer composition may comprise one or more fillers. Fillers for use as an additive in the invention include, for example, carbon black; clay; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; formaldehyde, polystyrene, and poly(alphamethyl)-styrene resins, natural fibers, synthetic fibers, and the like. In an embodiment, the composition can comprise one or more fillers in an amount from 15 to 40, or from 20 to 35, or from 25 to 30, wt %, based on the weight of the composition. In an embodiment, the composition comprises a carbon black filler.

Additives

The polymer composition may comprise one or more additives. Additives include, but are not limited to, plasticizers, processing oils, vulcanization accelerators, crosslinking agents, antioxidants, antiozonants, peptizers, activators, fatty acids, accelerators, tackifiers, homogenizing agents, pigments, colorants, flame retardants, UV light stabilizers, fungicides, slip agents, and the like. In an embodiment, the composition can comprise combined weight of one or more additives of less than or equal to (≤) 10, or 7.5, or 5.0, or 2.5, or 2.0, or 1.5, or 1.0, wt %, based on the weight of the composition.

Plasticizers employed as additives in the invention include petroleum oil such as aromatic and naphthenic oils, and paraffinic oils (as a process oil), polyalkylbenzene oils; organic acid monoesters such as alkyl and alkoxyalkyl oleates and stearates; organic acid diesters such as dialkyl, dialkoxyalkyl, and alkyl aryl phthalates, terephthalates, sebacates, adipates, and glutarates; glycol diesters such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils such as castor, tall, rapeseed, and soybean oils and esters and epoxidized derivatives thereof; and the like.

Antioxidants and antiozonants additives for use in the invention include hindered phenols, bisphenols, and thio-bisphenols; substituted hydroquinones; tris(alkylphenyl) phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylanilne)-4,6-bis(octylthio)1,3,5-triazine, hexahydro-1,3,5-tris-β-(3,5-di-t-butyl-4-hydroxyphenyl)propionyl-s-triazine, 2,4,6-tris(n-1,4-dimethylpentylpphenylenediamino)-1,3,5-triazine, tris-(3,5-di-t-butyl-4-hydroxybenzyl)isocyanurate, nickel dibutyldithiocarbamate, 2-mercaptotolylimidazole and its zinc salt, petroleum waxes, and the like.

Other optional additives for use in the invention include activators such as metal oxides such as zinc, calcium, magnesium, cadmium, and lead oxides; fatty acids such as stearic, lauric, oleic, behenic, and palmitic acids and zinc, copper, cadmium, and lead salts thereof; di-, tri-, and polyethylene glycols; and triethanolamine); accelerators such as sulfenamides such as benzothiazoles, including bis-benzothiazoles, and thiocarbamyl sulfenamides, thiazoles, dithiocarbamates, dithiophosphates, thiurams, guanidines, xanthates, thioureas, and mixtures thereof; tackifiers such as rosins and rosin acids, hydrocarbon resins, aromatic indene resins, phenolic methylene donor resins, phenolic thermosetting resins, resorcenol-formaldehyde resins, and alkyl phenol formaldehyde resins such as octylphenol-formaldehyde resin; flame retardants such as metal hydrates such as aluminum trihydroxide and magnesium dihydroxide, or a halogenated alkane flame retardant, an aromatic halogenated flame retardant, and optionally a flame retardant synergist (e.g., metal oxide, halogenated paraffin, triphenylphosphate, dimethyldiphenylbutane, polycumyl); homogenizing agents, peptizers, pigments, colorants, UV light stabilizers, fungicides, slip agents, and the like.

Vulcanizing agents for use in the invention include sulfur-containing compounds such as elemental sulfur, 4,4'-dithiodimorpholine, thiuram di-and polysulfides, alkylphenol disulfides, and 2-morpholino-dithiobenzothiazole; peroxides such as ditertbutyl peroxide, tertbutylcumyl peroxide, dicumyl peroxide, 2,5dimethyl-2,5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane; metal oxides such as zinc, magnesium, and lead oxides; dinitroso compounds such as p-quinone dioxime and p,p'-dibenzoylquinone-dioxime; and phenol-formaldehyde resins containing hydroxymethyl or halomethyl functional groups. Elemental sulfur can be a crystalline elemental sulfur or an amorphous elemental sulfur, and either type can be in pure form or supported on an inert carrier; an example of a supported sulfur is Rhenogran S-80 (80% S and 20% inert carrier) from Rhein Chemie. In an embodiment, the sulfur-containing compounds and the peroxides are preferred vulcanizing agents, and the sulfur-containing compounds are most preferred. It is understood that mixtures of vulcanizing agents can be employed though this is generally not preferred. The suitability of any of these vulcanizing agents is well known to those skilled in the compounding art. The amount of the vulcanizing agent can range from about 1 to 5 wt %, based on the weight of the composition.

Mixing

It is understood that this invention contemplates that the mixing process may occur in sequential stages. For example, in an embodiment a two-stage mastication process can be used wherein all ingredients except vulcanizing agents and accelerators are masticated in a first stage, the first stage compound is cooled down, vulcanizing agents and accelerators are added, and the compound is then finished in a second mastication stage. This is done in order to avoid premature vulcanization caused by masticating at high temperatures in the presence of vulcanizing agents and accelerators. Vulcanization temperatures and time employed are typical. Temperatures ranging from about 121° C. to 232° C. (250° F. to about 440° F.), and times ranging from about 1 to about 120 minutes can be employed.

In an embodiment, the polyisoprene, polybutadiene and ethylene/α-olefin copolymer and/or ethylene/α-olefin multiblock copolymer are mixed dry, without the addition of an extender oil.

In a further embodiment, the polyisoprene, polybutadiene and ethylene/α-olefin copolymer and/or ethylene/α-olefin multiblock copolymer are mixed in the presence of an aromatic oil and/or a naphthenic oil and/or paraffinic oil.

In another embodiment, the polyisoprene, polybutadiene and ethylene/α-olefin copolymer and/or ethylene/α-olefin multiblock copolymer are premixed prior to the addition of other components.

Applications

The compositions of the invention can be used in preparing any of a variety of articles or manufacture or their component parts or portions. For purposes of illustration only, and not by way of limitation, such articles can be selected from the group consisting of tires and tire sidewalls, sidewall (rubber) inserts, treads, bead fillers, belts, hoses, tubes, gaskets, membranes, molded goods, extruded parts, automotive parts, and adhesives.

In an embodiment, the inventive compositions can contain at least one additive, for example, additives selected from the group consisting of fillers, fibers, plasticizers, oils, colorants, stabilizers, foaming agents, retarders, accelerators, crosslinking agents and other conventional additives.

The composition can be converted into a finished article of manufacture by any one of a number of conventional processes and apparatus. Illustrative processes include extrusion, calendering, injection molding, compression molding, fiber spinning, and other typical thermoplastic processes.

The invention is particularly useful in the manufacture of tire compounds that comprise a blend of polyisoprene, polybutadiene and ethylene/α-olefin copolymer and/or ethylene/α-olefin multiblock copolymer.

In an embodiment, the composition prepared in accordance with the process of this invention can be extruded through a die to produce elastomeric articles such as strip stock for the tread, sidewall, and bead filler components of a pneumatic tire, or used to produce sheet stock for the air retention inner liner. In a further embodiment, the composition prepared in accordance with this invention can be calendered onto textile or steel cord fabric to produce cord-reinforced sheet stock for the carcass and circumferential belt components of the tire.

In an embodiment, the "green" or unvulcanized tire is then built by assembling the various components (except circumferential belt and tread) on the surface of a cylindrical drum, radially expanding and axially compressing the assembly to produce a toroidal shape, then placing the belt and tread components in position around the circumference of the toroid. Finally, the green tire is vulcanized by inflating with high pressure steam against the inner surface of a closed, heated aluminum mold. In the early stage of the vulcanization process, when the various elastomeric compounds are still soft and flowable, the pressure of the tire against the inner surface of the mold produces the final precise shape, tread pattern, sidewall lettering, and decorative markings. Later, in the vulcanization process, heat-activated crosslinking reactions take place within the various elastomeric compounds, so that when the mold is finally opened, the compound has undergone crosslinking to a degree that is essentially optimum for the intended purpose.

In an embodiment, the vulcanizable composition produced by the process can be shaped and vulcanized into an elastomeric article or body. The elastomeric bodies can be readily CO-cured. Accordingly, the present invention includes a process for interfacial CO-curing of shaped elastomeric bodies in mutual contact. The process comprises (i) forming the vulcanizable elastomeric composition into a shaped elastomeric body; (ii) assembling the shaped elastomeric body so that it contacts another shaped elastomeric body comprising a major portion of a highly unsaturated rubber to produce an assembly; and (iii) vulcanizing the assembly under conditions so as to effect substantial crosslinking across an interface between the shaped elastomeric bodies.

In an embodiment, articles can be prepared by injection molding, extrusion, extrusion followed by either male or female thermoforming, low pressure molding, compression molding and the like.

A partial, far from exhaustive, listing of articles that can be fabricated from the compositions of the invention includes polymer films, fabric coated sheets, polymer sheets, foams, tubing, fibers, coatings, automotive parts, such as tires and tire components (e.g., sidewall inserts), computer parts, building materials, household appliances, electrical supply housings, trash cans, storage or packaging containers, lawn furniture strips or webbing, lawn mower, garden hose, and other garden appliance parts, refrigerator gaskets, acoustic systems, utility cart parts, desk edging, toys and water craft parts. The compositions can also be used in roofing applications such as roofing membranes. The compositions can further be used in fabricating components of footwear such as a shaft for a boot, particularly an industrial work boot. A skilled artisan can readily augment this list without undue experimentation.

Definitions

Unless stated to the contrary, implicit from the context, or customary in the art, all parts and percents are based on weight, and all test methods are current as of the filing date of this disclosure.

The terms "blend" or "polymer blend," as used herein, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "composition," as used herein, includes a mixture or blend of two or more materials which comprise the composition, as well as reaction products and decomposition products formed from the materials of the composition. Typically, any reaction products and/or decomposition products are present in trace amounts.

"Crosslinked" and similar terms generally mean that the polymer, shaped or in the form of an article, has xylene extractables of less than or equal to 30 wt % (i.e., greater than or equal to 70 wt % gel content), preferably less than or equal to 20 wt % (i.e., greater than or equal to 80 wt % gel content), more preferably less than or equal to 10 wt % (i.e., greater than or equal to 90 wt % gel content). Xylene extractables (and gel content) are determined in accordance with ASTM D-2765.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), trace amounts of impurities can be incorporated into the polymer and/or within the polymer, and the term interpolymer as defined hereinafter.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term, "ethylene-based polymer," as used herein, refers to a polymer that comprises at least 50 wt % or a majority weight percent polymerized ethylene monomer (based on the total weight of the polymer), and optionally may comprise at least one polymerized comonomer.

The term, "ethylene/α-olefin interpolymer," as used herein, refers to an interpolymer that comprises, in polymerized form, at least 50 wt % or a majority amount of ethylene monomer (based on the weight of the interpolymer), and at least one α-olefin that is randomly distributed within the interpolymer. Thus, this term does not include an ethylene/α-olefin block copolymer.

The term, "ethylene/α-olefin copolymer," as used herein, refers to a copolymer that comprises, in polymerized form, at least 50 wt % or a majority amount of ethylene monomer (based on the weight of the copolymer), and an α-olefin, as the only two monomer types. The α-olefin is randomly distributed within the copolymer. Thus, this term does not include an ethylene/α-olefin block copolymer.

The term, "propylene-based polymer," as used herein, refers to a polymer that comprises a majority weight percent polymerized propylene monomer (based on the total weight of the polymer), and optionally may comprise at least one polymerized comonomer.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "masticate," and similar terms, as used herein, refers to grinding, crushing and/or reducing in size of the particles of polymeric blends.

Test Methods

Melt Index, MI or I2 or $I_2$, for ethylene-based polymers (uncured) is measured in g/10 min, in accordance with ASTM D-1238, Condition 190° C./2.16 kilogram (kg) weight, formerly known as "Condition E", and is reported in grams eluted per 10 minutes. 3 to 8 g of pellet type samples were used to measure melt index.

Density of uncured samples is measured in accordance with ASTM D792, and reported as grams per cubic centimeter (g/cc or g/cm$^3$). A cube-shaped, uncured sample (10 mm×10 mm×10 mm) (1 to 1.5 g) cut from a rolled sheet of the uncured polymer was used to measure density.

Mooney Viscosity, MV, for polymer component(uncured) is measured as ML(1+4) at 100° C. and ML(1+4) at 121° C., in accordance with ASTM D1646 unless otherwise specified, using a rotation viscometer, Mooney viscometer (manufactured by Alpha Technology)), with a one minute preheat time and a four minute rotor operation time. Testing was run on two disc-shaped polymer samples (uncured) (45 mm diameter×10 mm thick (bottom) and 45 mm diameter×10 mm thick (upper)) cut from a rolled sheet of the polymer material.

Mooney Viscosity for formulation (final master batch, uncured), MV, is measured as ML(1+4) at ML(1+4) at 125° C., in accordance with ASTM D1646 unless otherwise specified, using a rotation viscometer, Mooney viscometer (manufactured by Alpha Technology), with a one minute preheat time and a four minute rotor operation time. Testing was run on two disc-shaped polymer samples (uncured) (45 mm diameter×10 mm thick (bottom), and 45 mm diameter×10 mm thick (upper)) cut from a rolled sheet of the polymer material.

Rheology (final master batch, uncured formulation) is measured in accordance with ASTM D5289, using an MDR2000제] moving die rheometer (Alpha Technologies). Tests are run at 180° C. for 15 minutes and at 140° C. for 120 minutes. Testing was conducted with using disc-shaped samples (uncured) (30 mm diameter×12.5 mm thick) cut from a rolled sheet of the polymer material.

Mechanical Properties (Final Master Batch, Cured)

Shore A hardness (final master batch, cured) is measured in accordance with ASTM D2240-05, using a durometer, Model GS-702N, manufactured by Teclock. Testing is run in triplicate (3 samples) on a 3-layer stack of dumbbell-shaped specimens cut from a rolled sheet having an average thickness of 2 mm. The total thickness of the test sample was 6 mm (2 mm×three sheets). The samples were cured by compression molding with a hot press for 15 minutes at 160° C. and 102 kg/cm² pressure. The dimensions of each of the dumbbell-shaped specimens were as follows: thickness 2 mm, entire length 115 mm, center narrow section length 33 mm, width at ends 25 mm, width of center narrow section 6 mm.

Elongation at break (%) (final master batch, cured) is measured in accordance with ASTM D412-98. Testing is run in triplicate (3 samples) on dumbbell shaped specimens cut from a rolled sheet having an average thickness of 2 mm, and cured by compression molding with hot press for 15 minutes at 160° C. and 102 kg/cm² pressure. The dimensions of the dumbbell-shaped specimens were as follows: thickness 2 mm, entire length 115 mm, center narrow section length 33 mm, width at ends 25 mm, width of center narrow section 6 mm. The testing is performed on a Universal Testing System (Model 3365) by Instron (Norwood, Mass.).

Tensile modulus at 50% strain (kg/cm²) (final master batch, cured) is measured in accordance with ASTM D412-98, using a Universal Testing System (Model 3365) by Instron (Norwood, Mass.). Testing is run in triplicate (3 samples) on dumbbell shaped specimens cut from a rolled sheet having an average thickness of 2 mm, and cured by compression molding with hot press for 15 minutes at 160° C. and 102 kg/cm² pressure. The dimensions of the dumbbell-shaped specimens were as follows: thickness 2 mm, entire length 115 mm, center narrow section length 33 mm, width at ends 25 mm, width of center narrow section 6 mm.

Tensile strength (kg/cm²) (final master batch, cured) is measured in accordance with ASTM D412-98, at room temperature (23° C.) with an elongation speed of 50 mm/min, using a Universal Testing System (Model 3365) by Instron (Norwood, Mass.). Testing is run in triplicate on three dumbbell shaped specimens cut from a rolled sheet and cured by compression molding with hot press for 15 minutes at 160° C. and 102 kg/cm² pressure. The dimensions of the dumbbell-shaped specimens were as follows: thickness 2 mm, entire length 115 mm, center narrow section length 33 mm, width at ends 25 mm, width of center narrow section 6 mm.

Heat generation (heat build-up) (Delta temp., ° C.) (final master batch, cured) is measured using a Goodrich Flexometer (Model FT-1100, manufacturer: Ueshima Seisakusho), in accordance with ASTM D623-07. Test specimens are in a cylindrical shape (17.8 mm diameter; 25 mm height). Initially, a sample is cut from an uncured, rolled sheet, and cured with a hot press for 25 minutes at 160° C. and 102 kg/cm² pressure. A compressive load is applied to the test specimen. Additional cyclic compression is continuously imposed on the rubber test samples at 1700 rpm for 30 minutes. The initial temperature is 50° C., and the final temperature is measured by thermocouple located at the bottom part anvil. Delta temperature by continuous deformation is measured according to the following formula:

$$\Delta T = T_{final} - T_{initial} \quad (2)$$

where $T_{initial}$ is the initial temperature, and $T_{final}$ is the final temperature of the sample after cyclic compression.

The following examples illustrate, but do not, either explicitly or by implication, limit the present invention. Unless otherwise indicated, all parts and percentages are by weight.

Experimental

The materials used in this study are shown in Tables 1A and 1B.

TABLE 1A

Materials

| Component | Type | Designation | Supplier | Density, g/cc | Melt Index, $I_2$, g/10 min [a] | Mooney viscosity |
|---|---|---|---|---|---|---|
| Rubber | Natural rubber (NR) | STR-20 | Tong Thai Technical Rubber Co., Ltd. | 0.92 | — | 60 [b] |
| | Butadiene rubber (BR) | KBR01 | Kumho Petrochemical | 0.91 | — | 45 [b] |
| | Polyolefin elastomer (POE) (Ethylene/octene copolymer) | ENGAGE 8003 | Dow Chemical Co. | 0.885 | 1.0 | 23 [c] |
| | | ENGAGE 8400 | Dow Chemical Co | 0.870 | 30.0 | 2 [c] |
| | | ENGAGE 8450 | Dow Chemical Co | 0.902 | 3.0 | 10 [c] |
| | | ENGAGE 8480 | Dow Chemical Co | 0.902 | 1.0 | 20 [c] |
| | | ENGAGE 8540 | Dow Chemical Co | 0.908 | 1.0 | 20 [c] |
| | | ENGAGE 8842 | Dow Chemical Co | 0.857 | 1.0 | 25 [c] |
| | Polyolefin elastomer (POE) (Ethylene/butene copolymer) | ENGAGE 7289 | Dow Chemical Co | 0.891 | <0.50 | 74 [d] (estim. MV at 121° C.: 90-110) |
| | Olefin Block Copolymer (OBC) (Ethylene/octene block copolymer) | INFUSE 9530 | Dow Chemical Co | 0.887 | 5.0 | 17 [c] |
| | | INFUSE 9010 | Dow Chemical Co | 0.887 | 0.50 | 43 [c] |

[a] Melt Index, $I_2$, g/10 mm at 2.16 kg@190° C. (ASTM D1238);

[b] Mooney viscosity at ML (1 + 4)@100° C.;

[c] Mooney viscosity at ML (1 + 4)@121° C. (ASTM D1646);

[d] Measured at 150° C.

TABLE 1B

Materials

| Component | Type | Designation | Supplier |
|---|---|---|---|
| Filler | Carbon black (CB) | N550 | OCI |
| Activator | Zinc oxide (ZnO) | Zinc oxide | Hanil |
| Activator | Stearic acid | Stearic acid | Eco Chemtech |
| Antioxidant | N-(1,3-Dimethylbutyl)-N'-phenyl-p-phenylenediamine | 6-PPD | Kumho Petrochemical |
| Antioxidant | 2,2,4-trimethyl-1,2-dihydroquinoline | RD | Stair Chem |
| Tackifier | Alkyl phenolic novolak resin | Dyphene 8318 | Kolon |
| Peptizer | 2,2'-dibenzamido-diphenyl-disulfide (DBD) with activating additive and binder | Renacit 4 | M&B GreenUs |
| Curatives | Insoluble sulfur (80% of sulfur and 20% oil treated) N-tert-butyl-2-benzothiazole-sulfenamide | Insoluble sulfur TBBS | Shikoku Chemicals Sun Sine |

Each formulation contained a rubber, for example, natural rubber (STR-20) and butadiene rubber (KBR 01), and polyolefin elastomer, for example, (POE) (ENGAGE) and/or olefin block copolymers (OBC) (INFUSE). The 2,2'-dibenzamido-diphenyl-disulfide (DBD), with an activating additive and binder (RENACIT 4), was used as a peptizing agent. Carbon black (N550) was used as a filler for reinforcing effect. Zinc oxide (ZnO) and stearic acid were used as activators, and N-(1,3-dimethylbutyl)-N'-phenyl-p-phenylenediamine (6-PPD) and 2,2,4-trimethyl-1,2-dihydroquinoline (RD) were used as anti-oxidants. Alkyl phenolic novolak resin (DYPHENE 8318) was used as a tackifier. For a cure system, insoluble sulfur (80% of sulfur and 20% oil treated) was used as crosslinking (vulcanizing) agent, and N-tert-butyl-2-benzothiazole-sulfenamide (TBBS) was used as an accelerator for curing. Formulations/compositions (master batches) are listed in Tables 4-6.

For each formulation, the components for a first master batch (1 MB) were mixed in a 1.8 liter internal mixer (Farrel Pomini), in accordance with the following procedure:

a) First, the natural rubber (NR) was mixed with a peptizing agent (Renecit-4), butadiene rubber (BR), and POE (ENGAGE) or OBC (INFUSE) for 30 seconds.

b) Carbon black (N550) was added to the internal mixer, and the temperature increased by the incorporating effect of the filler.

c) When the temperature reached 115° C., zinc oxide (ZnO) and alkyl phenolic novolak resin (Dyphene 8318) were added.

d) When the temperature reached 125° C., stearic acid, N-(1,3-Dimethylbutyl)-N'-phenyl-p-phenylenediamine, and 2,2,4-trimethyl-1,2-dihydroquinoline were added to the mixer.

e) At 150° C., the resulting mixture was discharged.

f) After discharging, the mixture was sheeted with two roll mill (manufactured by Hyupyoung) at 100° C., for twenty times, to form a sheet (thickness approx. 2.5 mm).

The procedure for preparing the first master batch (1 MB) is summarized in Table 2.

TABLE 2

Compounding process for 1st master batch (1MB)

| Item | Ingredients | Temperature (° C.) | Time (min:sec) |
|---|---|---|---|
| Polymer | NR, 2,2'-dibenzamido-diphenyl-disulfide (DBD) with activating additive and binder, BR, polyolefin elastomers (POE/ENGAGE) or olefin block copolymer (OBC/INFUSE) | 80 | 00:00 |
| Filler | Carbon black (N550) | 90 | 00:30 |
| Chemicals 1 | Zinc oxide and alkyl phenolic novolak resin (Dyphene 8318) | 115 | 01:30 |
| Chemicals 2 | stearic acid, N-(1,3-Dimethylbutyl)-N'-phenyl-p-phenylenediamine (6-PPD), 2,2,4-trimethyl-1,2-dihydroquinoline (RD) | 125 | 02:10 |
| Sweep | — | 130 | 03:00 |
| Discharge | — | 150 | 03:30 |

The first master batch (1 MB) was stored in sheet form for 24 hours, at room temperature, to cool down the temperature of the sample. The first master batch (1 MB) material was then mixed in an internal mixer with insoluble sulfur and accelerator, TBBS (N-tert-butyl-2-benzothiazole-sulfonamide), to form the final master batch (FMB), which was discharged at 105° C., as further described in Table 3. After discharging, the FMB material was sheeted using a two-roll mill at 100° C. for ten (10) times (thickness approx. 2.5 mm).

TABLE 3

Compounding process for final master batch (FMB)

| Item | Ingredients | Temperature (° C.) | Time (min:sec) |
|---|---|---|---|
| 1MB | 1st master batch, sulfur, and TBBS(N-tert-butyl-2-benzothiazole-sulfonamide) | 80 | 00:00 |
| Sweep | — | 95 | 01:00 |
| Discharge | — | 105 | 01:30 |

Compression molding: Specimens for Shore A hardness, and tensile strength testing were prepared by compressing the final master batch (FMB) material in a compression molding apparatus for 15 minutes, at 160° C., under 102 kg/cm$^2$ pressure. Dumbbell-shaped specimens were cut from the compressed sheet (average thickness of 2 mm) and cured at 160° C. for 25 minutes, under 102 kg/cm$^2$ pressure. The dimensions of the dumbbell-shaped specimens were as follows: thickness 2 mm, entire length 115 mm, center narrow section length 33 mm, width at ends 25 mm, width of center narrow section 6 mm.

Formulations for comparison (Comp. A-C) of POE or OBC/NR density ratios are shown in Table 4, along with inventive example 1-4.

TABLE 4

Density ratio comparisons (amounts in wt %)

| Item | Ingredient | Ex. A | Ex. B | Ex. C | Ex. 1 | Ex. 2 | Ex. 3 | Ex. 4 |
|---|---|---|---|---|---|---|---|---|
| 1 MB | STR-20 (NR) | 29.1 | 23.2 | 23.2 | 23.2 | 23.2 | 23.2 | 23.2 |
| | Renacit-4 (peptizer) | 0.06 | 0.03 | 0.03 | 0.03 | 0.03 | 0.03 | 0.03 |
| | KBR-01 (BR) | 29.1 | 23.2 | 23.2 | 23.2 | 23.2 | 23.2 | 23.2 |
| | ENGAGE 8842 | — | 11.6 | — | — | — | — | — |
| | ENGAGE 8400 | — | — | — | 11.6 | — | — | — |
| | ENGAGE 8003 | — | — | — | — | 11.6 | — | — |

TABLE 4-continued

| | Density ratio comparisons (amounts in wt %) | | | | | | | |
|---|---|---|---|---|---|---|---|---|
| Item | Ingredient | Ex. A | Ex. B | Ex. C | Ex. 1 | Ex. 2 | Ex. 3 | Ex. 4 |
| | ENGAGE 8450 | — | — | — | — | — | 11.6 | — |
| | INFUSE 9530 | — | — | — | — | — | — | 11.6 |
| | ENGAGE 8540 | — | — | 11.6 | — | — | — | — |
| | N550 (carbon black) | 29.1 | 29.1 | 29.1 | 29.1 | 29.1 | 29.1 | 29.1 |
| | ZnO (activator) | 2.9 | 2.9 | 2.9 | 2.9 | 2.9 | 2.9 | 2.9 |
| | Stearic acid (activator) | 1.2 | 1.2 | 1.2 | 1.2 | 1.2 | 1.2 | 1.2 |
| | 6-PPD (antioxidant) | 1.2 | 1.2 | 1.2 | 1.2 | 1.2 | 1.2 | 1.2 |
| | RD (antioxidant) | 1.2 | 1.2 | 1.2 | 1.2 | 1.2 | 1.2 | 1.2 |
| | Dyphene 8318 (tackifier) | 2.9 | 2.9 | 2.9 | 2.9 | 2.9 | 2.9 | 2.9 |
| 1 MB (First Masterbatch) total | | 96.5 | 96.5 | 96.5 | 96.5 | 96.5 | 96.5 | 96.5 |
| FMB | Insoluble sulfur (cure agent) | 2.9 | 2.9 | 2.9 | 2.9 | 2.9 | 2.9 | 2.9 |
| | TBBS (cure agent) | 0.6 | 0.6 | 0.6 | 0.6 | 0.6 | 0.6 | 0.6 |
| FM (Final Masterbatch) Total | | 100 | 100 | 100 | 100 | 100 | 100 | 100 |
| | Properties | | | | | | | |
| Density, g/cc (of formulation, uncured) | | 1.12 | 1.11 | 1.12 | 1.11 | 1.12 | 1.12 | 1.12 |
| Density ratio (POE or OBC/NR) | | — | 0.93 | 0.99 | 0.95 | 0.96 | 0.98 | 0.96 |
| Rheometer (180° C.) | Maximum torque (lb. in) | 32.2 | 26.3 | 26.7 | 279 | 282 | 27.0 | 28.7 |
| | Minimum torque (lb. in) | 3.0 | 2.4 | 2.7 | 2.4 | 2.7 | 2.4 | 2.5 |
| | T50 | 1.05 | 1.05 | 1.13 | 1.06 | 1.09 | 1.12 | 1.06 |
| Mooney viscosity, ML 1 + 4 at 125° C. (uncured) | | 55 | 50 | 49 | 40 | 50 | 47 | 45 |
| Mechanical 1 MB | Shore A | 64 | 67 | 77 | 71 | 74 | 78 | 75 |
| | STR-20 (NR) | 29.1 | 23.2 | 23.2 | 23.2 | 23.2 | 23.2 | 23.2 |
| | Renacit-4 (peptizer) | 0.06 | 0.03 | 0.03 | 0.03 | 0.03 | 0.03 | 003 |
| | KBR-01 (BR) | 29.1 | 23.2 | 23.2 | 23.2 | 23.2 | 23.2 | 23.2 |
| | ENGAGE 8842 | — | 11.6 | — | — | — | — | — |
| | ENGAGE 8400 | — | — | — | 11.6 | — | — | — |
| | ENGAGE 8003 | — | — | — | — | 11.6 | — | — |
| | ENGAGE 8450 | — | — | — | — | — | 11.6 | — |
| | INFUSE 9530 | — | — | — | — | — | — | 11.6 |
| | ENGAGE 8540 | — | — | 11.6 | — | — | — | — |
| | N550 (carbon black) | 29.1 | 29.1 | 29.1 | 29.1 | 29.1 | 29.1 | 29.1 |
| | ZnO (activator) | 2.9 | 2.9 | 2.9 | 2.9 | 2.9 | 2.9 | 2.9 |
| | Stearic acid (activator) | 1.2 | 1.2 | 1.2 | 1.2 | 1.2 | 1.2 | 1.2 |
| | 6-PPD (antioxidant) | 1.2 | 1.2 | 1.2 | 1.2 | 1.2 | 1.2 | 1.2 |
| | RD (antioxidant) | 1.2 | 1.2 | 1.2 | 1.2 | 1.2 | 1.2 | 1.2 |
| | Dyphene 8318 (tackifier) | 2.9 | 2.9 | 2.9 | 2.9 | 2.9 | 2.9 | 2.9 |
| 1 MB (First Masterbatch) total | | 96.5 | 96.5 | 96.5 | 96.5 | 96.5 | 96.5 | 96.5 |
| FMB | Insoluble sulfur (cure agent) | 2.9 | 2.9 | 2.9 | 2.9 | 2.9 | 2.9 | 2.9 |
| | TBBS (cure agent) | 0.6 | 0.6 | 0.6 | 0.6 | 0.6 | 0.6 | 0.6 |
| FM (Final Masterbatch) Total | | 100 | 100 | 100 | 100 | 100 | 100 | 100 |
| | Properties | | | | | | | |
| Density, g/cc (of formulation, uncured) | | 1.12 | 1.11 | 1.12 | 1.11 | 1.12 | 1.12 | 1.12 |
| Density ratio (POE or OBC/NR) | | — | 0.93 | 0.99 | 0.95 | 0.96 | 0.98 | 0.96 |
| Rheometer (180° C.) | Maximum torque (lb. in) | 32.2 | 26.3 | 26.7 | 27.9 | 28.2 | 27.0 | 28.7 |
| | Minimum torque (lb. in) | 3.0 | 2.4 | 2.7 | 2.4 | 2.7 | 2.4 | 2.5 |
| | T50 | 1.05 | 1.05 | 1.13 | 1.06 | 1.09 | 1.12 | 1.06 |
| properties of cured samples | Hardness | | | | | | | |
| | Modulus at 50% strain, kg/cm$^2$ | 19 | 23 | 34 | 26 | 30 | 35 | 30 |

TABLE 4-continued

| | | Density ratio comparisons (amounts in wt %) | | | | | | |
|---|---|---|---|---|---|---|---|---|
| Item | Ingredient | Ex. A | Ex. B | Ex. C | Ex. 1 | Ex. 2 | Ex. 3 | Ex. 4 |
| | Tensile strength, kg/cm$^2$ | 144 | 137 | 161 | 138 | 144 | 185 | 151 |
| | Elongation at break, % | 290 | 310 | 281 | 371 | 260 | 322 | 275 |
| Heat build-up | Delta temp., ° C. | 21.3 | 41.5 | 52.0 | 42.6 | 46.2 | 48.5 | 46.7 |

Example B (made with Engage 8842) had a POE/NR density ratio of 0.93 and a hardness value of 67, which would not result in an significant increased reinforcing effect for a tire sidewall insert compared to the Control Example A (no ethylene-based copolymer component) which had a hardness value of 64.

The delta temperature from the heat build-up test is a critical property for tires, with 50° C. being the upper limit. At higher levels of delta temperature for heat-build-up, the tire component (e.g., insert) could easily burst the tire during a continuous deformation condition such as driving. Example C (made with Engage 8540), which had a POE/NR density ratio of 0.99, would not provide a continuous deformation as required in a runflat tire application since the delta temperature of the material in the heat-build-up test was at 52° C., indicating a high capacity for heat build-up.

By comparison, Examples 1-4 showed higher hardness (from 71 to 78) compared to Examples A, and B, with delta temperatures below 50° C., indicating a lower capacity for heat build-up compared to Example C (52° C.).

Example 1 (made with ENGAGE 8400) had a POE Mooney viscosity/NR melt index ratio of 2, and showed a 3 point decrease in Mooney viscosity compared to the Control Example A (no ethylene-based copolymer), which made it difficult for extrusion process control. In the case of Example 1, the Mooney viscosity (40) was too low to handle the material for the extrusion process, although Shore hardness A (71) and heat-build-up (32.6° C.) were satisfied with this formulation.

Example C (made with ENGAGE 8540) had a POE Mooney viscosity/NR melt index ratio of 150, and an increased Mooney viscosity (MV) (74) compared to the Control Example A (no ethylene—based copolymer) (MV of 55), with a corresponding decrease in tensile strength from 144 (Example A) to 124 kgf/cm$^2$. For Examples 2 to 4, tensile strength was similar with Control Example A, and the POE Mooney viscosity/NR melt index ratio ranged from 12 to 60, with a Mooney viscosity of the compounds ranging from 45 to 50, which is acceptable for extrusion processing.

TABLE 5

| | POE or OBC Mooney viscosity/NR Melt Index ratio comparisons (in wt %) | | | | | | |
|---|---|---|---|---|---|---|---|
| Item | Ingredient | Ex. A | Ex. 1 | Ex. C | Ex. 2 | Ex. 3 | Ex. 4 |
| 1 MB | STR-20 (NR) | 29.1 | 23.2 | 23.2 | 23.2 | 23.2 | 23.2 |
| | Renacit-4 (peptizer) | 0.06 | 0.03 | 0.03 | 0.03 | 0.03 | 0.03 |
| | KBR-01 (BR) | 29.1 | 23.2 | 23.2 | 23.2 | 23.2 | 23.2 |
| | ENGAGE 8842 | — | — | — | — | — | — |
| | ENGAGE 8400 | — | 11.6 | — | — | — | — |
| | ENGAGE 8003 | — | — | — | 11.6 | — | — |
| | ENGAGE 8450 | — | — | — | — | 11.6 | — |
| | INFUSE 9530 | — | — | — | — | — | 11.6 |
| | ENGAGE 8540 | — | — | 11.6 | — | — | — |
| | N550 (carbon black) | 29.1 | 29.1 | 29.1 | 29.1 | 29.1 | 29.1 |
| | ZnO (activator) | 2.9 | 2.9 | 2.9 | 2.9 | 2.9 | 2.9 |
| | Stearic acid (activator) | 1.2 | 1.2 | 1.2 | 1.2 | 1.2 | 1.2 |
| | 6-PPD (antioxidant) | 1.2 | 1.2 | 1.2 | 1.2 | 1.2 | 1.2 |
| | RD (antioxidant) | 1.2 | 1.2 | 1.2 | 1.2 | 1.2 | 1.2 |
| | Dyphene 8318 (tackifier) | 2.9 | 2.9 | 2.9 | 2.9 | 2.9 | 2.9 |
| 1 MB total | | 96.5 | 96.5 | 96.5 | 96.5 | 96.5 | 96.5 |
| FMB | Insoluble sulfur (cure agent) | 2.9 | 2.9 | 2.9 | 2.9 | 2.9 | 2.9 |
| | TBBS (cure agent) | 0.6 | 0.6 | 0.6 | 0.6 | 0.6 | 0.6 |
| FM Total | | 100 | 100 | 100 | 100 | 100 | 100 |

TABLE 5-continued

POE or OBC Mooney viscosity/NR Melt Index ratio comparisons (in wt %)

| Item | Ingredient | Ex. A | Ex. 1 | Ex. C | Ex. 2 | Ex. 3 | Ex. 4 |
|---|---|---|---|---|---|---|---|
| | | | Properties | | | | |
| Density, g/cc (of formulation, uncured) | | 1.12 | 1.11 | 1.12 | 1.12 | 1.12 | 1.12 |
| Ratio of [Mooney NR]/[MI Elastomer(POE or OBC)] | | — | 2 | 150 | 60 | 20 | 12 |
| Rheometer (180° C.) | Maximum torque (lb. in) | 32.2 | 27.9 | 24.7 | 28.2 | 27.0 | 28.7 |
| | Minimum torque (lb. in) | 3.0 | 2.4 | 2.8 | 2.7 | 2.4 | 2.5 |
| | T50 | 1.05 | 1.06 | 1.10 | 1.09 | 1.12 | 1.06 |
| Mooney viscosity, ML 1 + 4 at 125° C. (uncured) | | 55 | 40 | 74 | 50 | 47 | 45 |
| Mechanical properties of cured samples | Shore A Hardness | 64 | 71 | 77 | 74 | 78 | 75 |
| | Modulus at 50% strain, kg/cm$^2$ | 19 | 26 | 36 | 30 | 35 | 30 |
| | Tensile strength, kg/cm$^2$ | 144 | 138 | 124 | 144 | 185 | 151 |
| | Elongation at break, % | 290 | 271 | 187 | 260 | 322 | 275 |
| Heat build-up | Delta temperature, ° C. | 21.3 | 32.6 | 37.6 | 36.2 | 38.5 | 36.7 |

TABLE 6

POE/NR and OBC/NR weight ratio comparisons (amounts in wt %)

| Item | Ingredient | Ex. A | Ex. E | Ex. F | Ex. 5 | Ex. 2 | Ex. 6 | Ex. 4 |
|---|---|---|---|---|---|---|---|---|
| 1 MB | STR-20 (NR) | 29.1 | 20.3 | 20.3 | 26.1 | 23.2 | 26.1 | 23.2 |
| | Renacit-4 (peptizer) | 0.06 | 0.04 | 0.04 | 0.05 | 0.05 | 0.05 | 0.05 |
| | KBR-01 (BR) | 29.1 | 20.3 | 20.3 | 26.1 | 23.2 | 26.1 | 23.2 |
| | ENGAGE 8003 | — | 17.4 | — | 5.8 | 11.6 | — | — |
| | INFUSE 9530 | — | — | 17.4 | — | — | 5.8 | 11.6 |
| | N550 (carbon black) | 29.1 | 29.1 | 29.1 | 29.1 | 29.1 | 29.1 | 29.1 |
| | ZnO (activator) | 2.9 | 2.9 | 2.9 | 2.9 | 2.9 | 2.9 | 2.9 |
| | Stearic acid (activator) | 1.2 | 1.2 | 1.2 | 1.2 | 1.2 | 1.2 | 1.2 |
| | 6-PPD (antioxidant) | 1.2 | 1.2 | 1.2 | 1.2 | 1.2 | 1.2 | 1.2 |
| | RD (antioxidant) | 1.2 | 1.2 | 1.2 | 1.2 | 1.2 | 1.2 | 1.2 |
| | Dyphene 8318 (tackifier) | 2.9 | 2.9 | 2.9 | 2.9 | 2.9 | 2.9 | 2.9 |
| 1 MB total | | 96.5 | 96.5 | 95.1 | 96.5 | 96.5 | 95.1 | 96.5 |
| FMB | Insoluble sulfur (cure agent) | 2.9 | 2.9 | 2.9 | 2.9 | 2.9 | 2.9 | 2.9 |
| | TBBS (cure agent) | 0.6 | 0.6 | 0.6 | 0.6 | 0.6 | 0.6 | 0.6 |
| FMB Total | | 100.0 | 100.0 | 100.0 | 100.0 | 100.0 | 100.0 | 100.0 |
| | | | | Properties | | | | |
| Density (g/cc) (of formulation, uncured) | | 1.12 | 1.11 | 1.11 | 1.12 | 1.12 | 1.12 | 1.12 |
| Weight ratio (POE/NR or OBC/NR) | | — | 0.83 | 0.83 | 0.21 | 0.48 | 0.21 | 0.48 |
| Rheometer (180° C.) | Maximum torque (lb. in) | 30.57 | 24.65 | 24.34 | 29.79 | 25.86 | 29.55 | 27.75 |
| | Minimum torque (lb. in) | 3.24 | 2.64 | 2.23 | 3.15 | 2.88 | 2.99 | 2.57 |
| | T50 | 0.95 | 1.021 | 0.992 | 0.977 | 1.039 | 0.958 | 0.956 |
| Mooney viscosity, ML 1 + 4 at 125° C. (uncured) | | 47.3 | 40.2 | 32.7 | 46.6 | 42.9 | 43.8 | 38.1 |
| Mechanical properties of cured samples | Shore A Hardness | 65 | 80 | 78 | 70 | 74 | 70 | 74 |
| | Modulus at 50% strain, kg/cm$^2$ | 17.6 | 33.7 | 34.8 | 21.7 | 25.6 | 20.7 | 26.2 |
| | Tensile strength, kg/cm$^2$ | 164 | 177.4 | 162.5 | 151.0 | 156.6 | 162.7 | 166.8 |
| | Elongation at break, % | 332 | 325.5 | 310.6 | 303.5 | 314.9 | 333.2 | 334.1 |

TABLE 6-continued

| | POE/NR and OBC/NR weight ratio comparisons (amounts in wt %) | | | | | | | |
|---|---|---|---|---|---|---|---|---|
| Item | Ingredient | Ex. A | Ex. E | Ex. F | Ex. 5 | Ex. 2 | Ex. 6 | Ex. 4 |
| Heat build-up | Delta temperature, °C. | 22.1 | 56.2 | 51.7 | 30.3 | 46.3 | 28.8 | 37.6 |

In cases in which the POE/NR or OBC/NR weight ratio was below 0.481, as in Examples 2 and 4-6, the delta temperature by heat-build-up was below 50° C., ranging from 28.8 to 46.3° C. However, if POE/NR or OBC/NR weight ratio was over 0.825, as in Examples E and F, the delta temperature was over 50° C. (i.e., 56.2 and 51.7° C., respectively, indicating a high capacity for heat build-up, which would not provide a continuous deformation or an acceptable level of endurance as required in a run-flat tire application.

The invention claimed is:

1. A composition comprising, at least the following:
  A) a natural rubber having a density from 0.90 to 0.93 g/cm$^3$ and a Mooney viscosity (ML(1+4)@100° C.) from 50 to 90;
  B) a butadiene rubber having a density from 0.90 to 0.93 g/cm$^3$ and a Mooney viscosity (ML(1+4)@100° C.) from 40 to 110; and
  C) at least one ethylene-based polymer selected from the following:
    i) an ethylene/α-olefin copolymer having a density from 0.870 to 0.902, a Mooney viscosity (ML(1+4)@121° C.) from 2 to 23;
    ii) an ethylene/α-olefin multiblock copolymer having a density from 0.866 to 0.887, a Mooney viscosity (ML(1+4)@121° C.) from 4 to 20; or
    iii) a combination of i) and ii).

2. The composition of claim 1, wherein the ethylene/α-olefin copolymer has a melt index (I$_2$) from 1 to 30 g/10 min, and/or the ethylene/α-olefin multiblock copolymer has a melt index (I$_2$) from 1 to 15 g/10 min.

3. The composition of claim 1, wherein the density ratio of Component C to Component A is from 0.94 to 1.00.

4. The composition of claim 1, wherein the ratio of the Mooney viscosity of Component A to the melt index of Component C is from 12 to 60.

5. The composition of claim 1, wherein Component C is i) an ethylene/α-olefin copolymer, and the weight ratio of Component C to Component A is from 0.22 to 0.64.

6. The composition of claim 1, wherein Component C is ii) an ethylene/α-olefin multiblock copolymer, and the weight ratio of Component C to Component A is from 0.20 to 0.50.

7. The composition of claim 1, comprising a sum total of Components A, B and C of at least 80 wt %, based on the total weight of the composition.

8. The composition of claim 1, comprising less than 1 wt % of an ethylene/α-olefin/diene (EAODM) interpolymer.

9. A crosslinked composition formed from the composition of claim 1.

10. An article, comprising at least one component formed from the composition of claim 1.

* * * * *